United States Patent

[11] 3,590,459

[72] Inventor Wolfgang Katz
 722 Dauchingen, Germany
[21] Appl. No. 760,795
[22] Filed Sept. 19, 1968
[45] Patented July 6, 1971
[32] Priority Sept. 23, 1967
[33] Germany
[31] P 16 25 567.7

[54] APPARATUS FOR INTRODUCING ROLLING ELEMENTS INTO CAGES OF ANTIFRICTION BEARINGS
13 Claims, 2 Drawing Figs.
[52] U.S. Cl. .................................................. 29/201
[51] Int. Cl. .................................................. B23p 19/04
[50] Field of Search ......................................... 29/201, 148.4 A, 200 P, 200, 148.4

[56] References Cited
UNITED STATES PATENTS
2,997,778 8/1961 Barkley ..................... 29/201

Primary Examiner—Thomas H. Eager
Attorney—Michael S. Striker

ABSTRACT: Apparatus for forcibly introducing balls into concave sockets of cylindrical cages for use in antifriction bearings wherein the cages consist of elastically deformable synthetic plastic material and comprise sockets whose open ends have diameters smaller than the diameter of a ball includes a support which rotates a cage about a horizontal axis adjacent to the periphery of a rotary drum having pockets which receive balls from chutes and introduce such balls into successive sockets of the cage. A quick-release device is provided to permit rapid removal of a loaded cage and rapid insertion of a fresh cage.

APPARATUS FOR INTRODUCING ROLLING ELEMENTS INTO CAGES OF ANTIFRICTION BEARINGS

BACKGROUND OF THE INVENTION

The present invention relates to apparatus for introducing balls or analogous rolling elements into sockets provided in cages for antifriction bearings.

Cages for antifriction bearings normally consist of metal, particularly bronze. As a rule, such cages resemble hollow cylinders and are formed with radial bores. One end of each bore is thereupon upset and the rolling elements are introduced through the other ends of bores. In the final step, the other ends of bores are upset to thus confine the rolling elements in the sockets between the ends of the corresponding bores. It is also known to assemble cages of two cylindrical shells. The rolling elements are placed between the shells and the shells are thereupon riveted, welded, soldered or otherwise secured to each other. Each of the just described procedures is time-consuming and includes a large number of steps.

It is further known to produce cages for rolling elements of synthetic plastic material. Such cages are assembled of a large number of plastic rings which are formed with concave recesses. Rolling elements are placed into the recesses of adjoining rings and the rings are thereupon bonded to each other to constitute a complete cage. Such mode of assembling cages, too, is very time consuming and the assembly of cages and of rolling element with the rings of cages must be carried out in complicated machinery.

SUMMARY OF THE INVENTION

It is an object of the present invention to provide a novel and improved apparatus for introducing rolling elements into cages which preferably consist of elastically deformable synthetic plastic material, particularly into one-piece cages which are formed with concave sockets having open ends whose diameters are smaller than the diameters of spherical rolling elements to be introduced into such sockets.

Another object of the invention is to provide an apparatus which is particularly suited for automatic introduction of spherical rolling elements into sockets of annular cages which consist of elastically deformable synthetic plastic material.

A further object of the invention is to provide an apparatus which can introduce rolling elements into cages having a single annulus of sockets or two or more annuli of such sockets.

An additional object of the invention is to provide an apparatus which can be operated automatically, semiautomatically or manually.

Still another object of the invention is to provide an apparatus which can be readily converted for introduction of rolling element into smaller, bigger, shorter, longer, thicker and/or thinner cages of plastic or metallic material.

The apparatus of my invention is employed to introduce rolling elements into sockets of cages for use in antifriction bearings, particularly for introducing spherical rolling elements into concave sockets of elastically deformable annular cages or sheetlike blanks of synthetic plastic material. The apparatus comprises support means arranged to support a cage for movement in a predetermined direction, conveyor mean adjacent to the support means and rotatable about a fixed axis, pockets or analogous receiving means provided on the conveyor means to receive and transport rolling elements, a feed for supplying rolling elements into the receiving means of the conveyor means, and means for synchronizing movements of the support means and conveyor means so that successive receiving means register with and admit rolling elements into successive sockets of the cage on the support means. The feed preferably defines at least one duct which supplies to the receiving means rolling elements by gravity feed and the synchronizing means is preferably arranged to rotate the conveyor means and the support means for annular cages in opposite directions in such a way that the speed of travel of sockets in the cage on the support means equals the speed of travel of receiving means on the conveyor means.

The conveyor means preferably comprises a drum whose peripheral surface is provided with one or more annuli of concave pockets and the apparatus preferably further comprises a shroud which is adjacent to and defines with the drum a channel in which rolling elements extending into the pockets of the drum advance along a preferably semicircular path from the feed to a transfer station where the pockets admit rolling elements into the sockets of the cage on the support means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment of reference to the accompanying drawing.

DESCRIPTION OF THE PREFERRED EMBODIMENT

Figure 1:
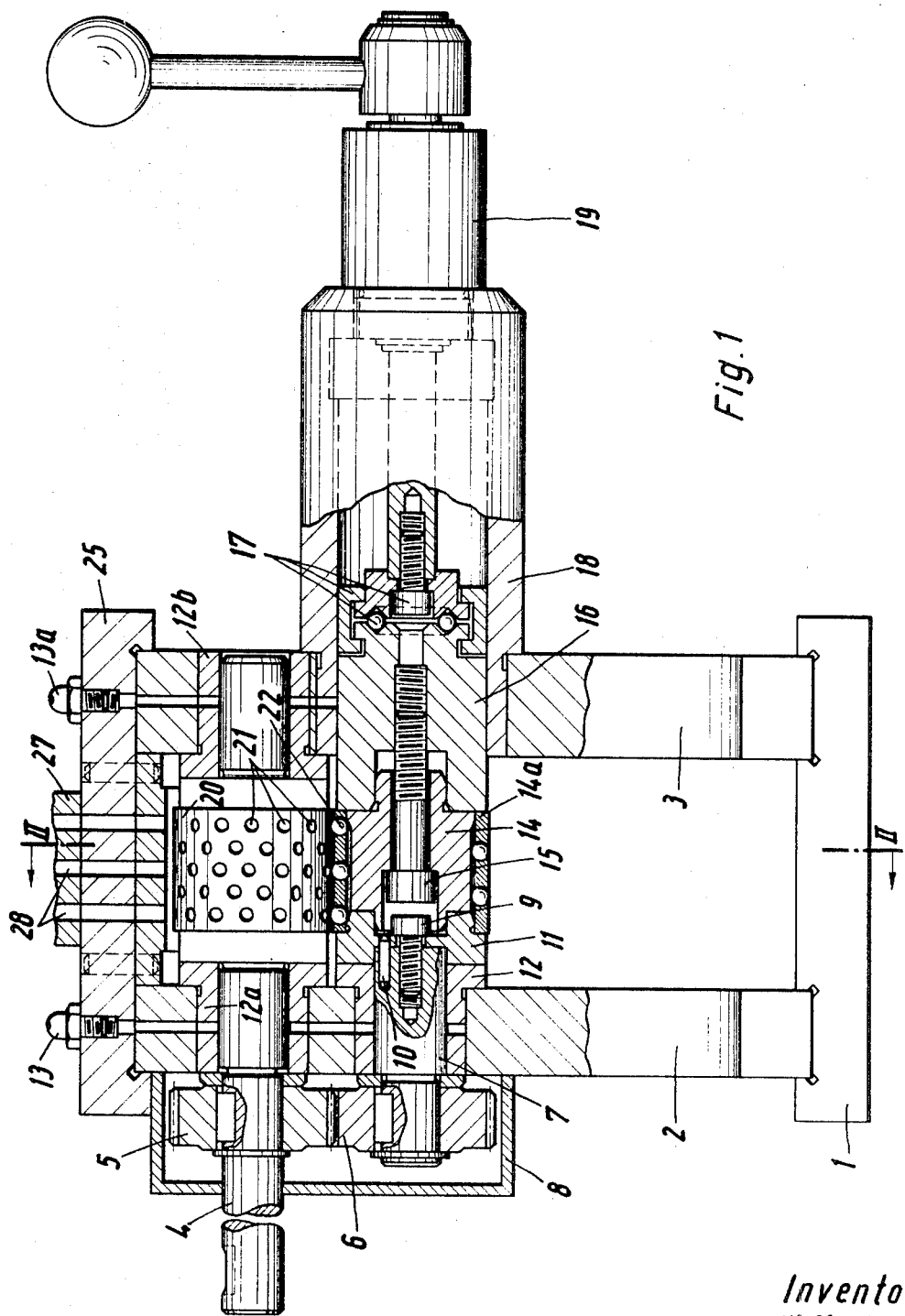
FIG. 1 is a partly elevational and partly central longitudinal vertical sectional view of an apparatus which embodies the invention.

The illustrated apparatus comprises a frame including a base plate 1 which supports two parallel upright walls 2 and 3. A horizontal driver shaft 4 is journaled in the upper portions of walls 2, 3 and is driven by a motor through the intermediary of a suitable transmission, not shown. The shaft 4 carries a spur gear 5 which meshes with a second spur gear 6 keyed to a second horizontal shaft or countershaft 7 which is journaled in the wall 2 and serves as a part of a rotary support for a cylindrical or annular cage 14a or elastically deformable synthetic plastic material. The cage 14a has several circumferentially extending rows or groups of concave sockets 14b for spherical rolling elements 22. A Protecting cap is mounted at the outer side of the wall 2 and encloses the gears 5 and 6. These gears have the same number of teeth so that the shafts 4 and 7 rotate the same speed.

The shaft 7 is rigidly connected with a ring 11 by way of centrally located bolt 8 and an eccentric dowel pin 10 so that the ring 11 shares all rotary movements of the gear 6. The ring 11 abuts against the adjoining end face of a bearing sleeve 12 provided in the wall 2 and surrounding a portion of the shaft 7. A second bearing sleeve 12a is mounted in the wall 2 at a level above the sleeve 12 to accommodate a portion of the driver shaft 4. Both sleeves can be lubricated by way of a nipple 13 provided in a crosshead 25 which is mounted on top of the walls 2 and 3. A second nipple 13a is provided on the frame to permit lubrication of the right-hand bearing sleeve 12*12* for the shaft 4. The ring 11 serves as an abutment for the left-hand end face of the cage 14a, as viewed in FIG. 1. The cage surrounds a cylindrical mandrel 14 which is connected to a second ring 16 by an axially extending bolt 15. The ring 16 abuts against the other end face of the cage 14a and is rotatable in antifriction thrust bearings 17 provided therefor in a casing 18 which is affixed to the wall 3. In addition, the ring 16 is movable axially toward and away from the ring 11 by way of a quick-release device 19 of known design. The device 19 can retract the mandrel 14 into the casing 18 whereby a loaded cage 14a can be readily stripped off the mandrel to be replaced by a fresh cage. The device 19 thereupon returns the mandrel 14 to the position shown in FIG. 1 in which the cage abuts against the rings 11, 16 and is free to rotate with the parts 6, 7, 11, 14 and 16 in response to rotation of the driver shaft 4.

The driver shaft 4 is keyed to or integral with a drum-shaped endless conveyor 20 which is installed between the walls 2, 3 in alignment with the cage 14a on the mandrel 14 when the latter assume the operative position shown in FIG. 1. The peripheral surface of the conveyor 20 is formed with concave pockets 21 or analogous receiving means for spherical rolling elements 22 which are supplied thereto by a feed mounted on a crosshead 25. This crosshead further supports a shroud 23 (see FIG. 2) which is provided with a concave guide surface 24 defining with the peripheral surface of the conveyor 20 an arcuate channel or passage 24a which is just wide enough to permit entry and downward movement of rolling elements 22 which are properly accommodated in the pockets 21. Such rolling elements are transported by the conveyor 20 to a transfer station 30 at the discharge end of the channel 24a where the rolling elements are forced to enter successive sockets 14b of the cage 14a. The shroud 23 can be affixed to one or both walls 2, 3 in addition to or instead of being secured to the crosshead 25. The direction in which the gear 4 rotates the conveyor 20 is indicated by arrow A, i.e., the feed admits rolling elements 22 into the pockets 21 which reach the top portion of the conveyor 20 and the thus loaded pockets travel along the channel 23a and toward the transfer station 30.

Figure 2:
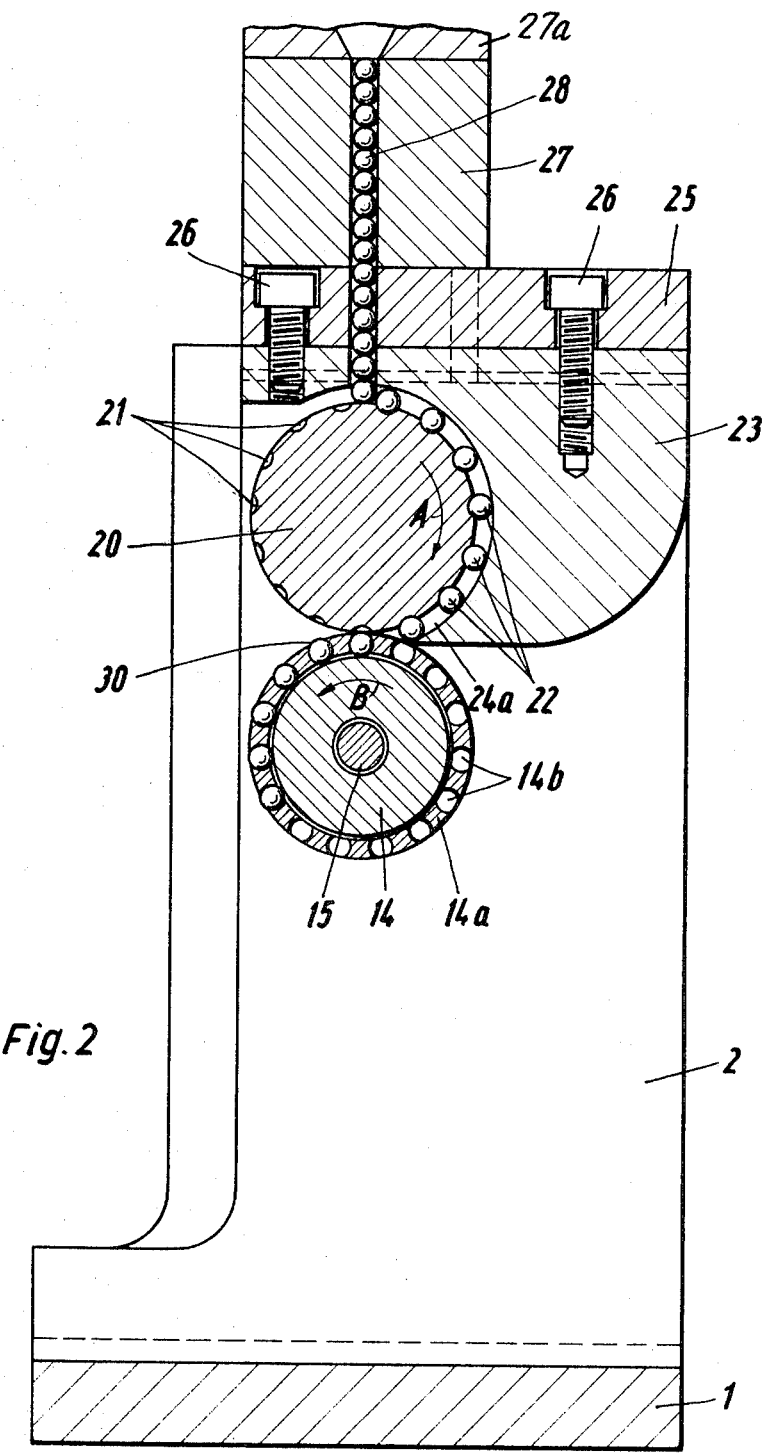
FIG. 2 is a transverse vertical sectional view as seen in the direction of arrows from the line II-II of FIG. 1.

The crosshead 25 is affixed to the shroud 23 by bolts 26 shown in FIG. 2. The aforementioned feed comprises a magazine or hopper 27a and an outlet member or guide means 27 which is provided with several vertical or nearly vertical ducts or chutes 28 for columns or rolling elements 22 issuing from the magazine 27a which latter is mounted on top of the outlet member 27. The rolling descend by gravity and each duct 28 is aligned with an annulus of pockets 21 in the peripheral surface of the conveyor 20. It will be noted that the ducts 28 extend through the crosshead 25 and through the top portion of the shroud 23.

The operation is as follows:

The magazine 27a contains a supply of rolling elements 22 which also fill the ducts 28 all the way to the peripheral surface of the conveyor 20. A fresh annular cage 14a is mounted on the mandrel 14 in the aforedescribed manner and the quick-release device 29 is then caused to move the mandrel to the position shown in FIG. 1. The cage then abuts against the rings 11, 16 and is coupled for rotation with the shaft 7. The drive including the shaft 4 is then rotated through an angle which suffices to cause the cage 14a to complete a full revolution whereby successive sockets 14b of the cage travel past the transfer station 30 at the discharge end of the channel 24a and each such socket receives a rolling element 22 from e registering pocket 21 in the peripheral surface of the conveyor 20. The gears 5, 6 synchronize rotary movements of the shafts 4 and 7 in such a way that successive empty sockets 14b register with successive loaded pockets 21 when the conveyor 20 rotates in the direction indicated by arrow A. Empty pockets 21 travel upwardly toward and past the lower ends of corresponding ducts 28 and are automatically filled with fresh rolling elements 22. The direction in which the mandrel 14 rotates with the cage 14a when the motor drives the shaft 4 is indicated in FIG. 2 by arrow B.

The diameters of the inner and outer ends of the sockets 14b are smaller than the diameter of a rolling element 22. However, the introduction of rolling elements though the outer ends of such sockets presents no problems because the cage 14a preferably consists of elastically deformable synthetic plastic material.

When the mandrel 14 completes a full revolution, the shaft 4 comes to a halt and the quick-release device 19 is manipulated to move the mandrel 14 away from the ring 11 so that the loaded cage 14a can be readily replaced by a fresh cage. The arrangement is preferably such that the drum 20 completes a full revolution when the cage 14a on the mandrel 14 completes a full revolution. The improved apparatus can be modified in a number of ways without departing from the spirit of my invention. For example, the hopper 27a can be omitted if the outlet number 27 is removable and replaceable by loaded outlet members which discharge one or more columns of rolling elements by gravity feed. Also, the chutes 28 can be inclined with reference to a vertical plane as long as they can discharge rolling elements into successive pockets of the conveyor 20 by gravity feed.

If the cage 14a is replaced by a cage blank which resembles a sheet and is formed with sockets 14b, the support means for the cage preferably resembles a plate which is movable tangentially of the conveyor 20 and in synchronism therewith so that each successive socket or each successive group of sockets registers with successive pockets or successive groups of pockets in the conveyor. It is clear that the sheetlike cage blank or the annular cage 14a of FIGS. 1 and 2 must be mounted on the supporting means in such a way that the sockets 14a invariably register with the pockets 21 when the apparatus is in use.

What I claim as new and desired to be protected by Letters Patent is set forth in the appended

1. Apparatus for introducing rolling elements into sockets of cages in antifriction bearings, particularly for forcibly introducing spherical rolling elements into concave sockets of elastically deformable sheetlike or annular cages, comprising support means arranged to support a cage and being movable therewith in a predetermined direction; conveyor means adjacent to said support means and having pockets for rolling elements, said conveyor means being rotatable about a predetermined axis; a feed including guide means for supplying and guiding rolling elements into the pockets of said conveyor means while said conveyor means rotates about said axis; and means for synchronizing the movement of said support means in said predetermined direction with the rotary movement of said conveyor means about said axis so that successive pockets of the rotating conveyor mans register with the admit rolling elements into successive sockets of the cage moving with said support means.

2. Apparatus as defined in claims 1, wherein said guide means has at least one duct which supplies rolling elements to said pockets by gravity feed.

3. Apparatus as defined in claim 1, wherein said support means is rotatable and said synchronizing means is arranged to rotate said conveyor means and said support means in opposite directions.

4. Apparatus as defined in claim 1, wherein said support means comprises a rotary mandrel arranged to extend into an annular cage during transfer of rolling elements from said pockets into the sockets of such annular cage.

5. Apparatus as defined in claim 1, wherein said conveyor means comprises a driver shaft and said support means comprises a second shaft, said synchronizing means comprising mating gears affixed to said shafts.

6. Apparatus as defined in claim 5, wherein one of said shafts is arranged to drive the other shaft and wherein said gears are arranged to rotate said other shaft at the speed of said one shaft.

7. Apparatus as defined in claim 1 wherein said conveyor means comprises a drum having a cylindrical peripheral surface and wherein said pockets are concave recesses provided in said peripheral surface.

8. Apparatus as defined in claim 7, further comprising shroud means defining with said peripheral surface a channel in which the rolling elements accommodated in the pockets of said drum advance form said guide means toward a transfer station where the rolling elements enter the sockets of the cage on said support means.

9. Apparatus as defined in claim 8, wherein said channel is of substantially semicircular shape.

10. Apparatus as defined in claim 1, wherein said conveyor means comprises several annuli of pockets.

11. Apparatus as defined in claim 1, further comprising quick release means for permitting separation of a loaded cage from said support means.

12. Apparatus as defined in claim 1, wherein said support means comprises two coaxial rotary members arranged to engage the end faces of an annular cage and further comprising means for moving one of said rotary members axially toward and away from the other rotary member.

13. Apparatus as defined in claim 1, wherein said support means comprises a mandrel arranged to extend into an annular cage on said support means and a pair of annular members flanking said mandrel and arranged to engage the end faces of the annular cage on said mandrel.